United States Patent [19]
Trnka, deceased et al.

[11] 4,157,843
[45] Jun. 12, 1979

[54] HOSE COUPLING

[76] Inventors: Otto A. Trnka, deceased, late of Saugerties, N.Y.; by Bertha E. Trnka, administrator; Gilbert Trnka, administrator, both of 3270 Wrolsen Dr., Saugerties, N.Y. 12477

[21] Appl. No.: 845,385

[22] Filed: Oct. 25, 1977

[51] Int. Cl.² .............................................. F16L 33/16
[52] U.S. Cl. ................................... 285/113; 285/255; 285/259
[58] Field of Search ............... 285/113, 255, 242, 259, 285/421, 339, 241, 240, 104, 105, 100, 102, 306

[56] References Cited

U.S. PATENT DOCUMENTS

| 1,064,154 | 6/1913 | Miller | 285/255 |
| 1,926,270 | 9/1933 | Eastman | 285/259 X |
| 2,152,975 | 4/1939 | Sanford | 285/259 X |
| 2,464,416 | 3/1949 | Raybould | 285/259 X |
| 3,226,137 | 12/1965 | Trnka | 285/113 |
| 3,741,238 | 6/1973 | Lacey | 285/255 X |
| 3,930,676 | 1/1976 | Adams | 285/259 |
| 3,999,783 | 12/1976 | Legris | 285/323 X |

FOREIGN PATENT DOCUMENTS

| 642527 | 7/1962 | Italy | 285/242 |
| 1275743 | 5/1972 | United Kingdom | 285/255 |

*Primary Examiner*—Thomas F. Callaghan

[57] ABSTRACT

A singly or doubly tapered sleeve for gripping a hose in a hose coupler so that the gripping action on the hose is modified by changes in water pressure in and end pulls on the hose.

3 Claims, 6 Drawing Figures

HOSE COUPLING

BACKGROUND OF THE INVENTION

A prior U.S. Pat. No. 3,226,137, filed on Apr. 16, 1962 and issued on Dec. 28, 1965 to applicant of this invention, relates to a means for securing a hose to a sleeve in a coupling device so that when the hose is charged, i.e., having water under pressure flowing through it, the force of the water assists in urging the hose in closer contact with the sleeve and coupling so as to increase the gripping action of the hose to the coupling unit.

The coupling described in U.S. Pat. No. 3,226,137 is particularly suitable for use with fire hoses whose individual lengths between couplings would be of the order of 500 feet or less and such hoses are charged with varying water pressures of zero to Hose Burst Pressure in lbs. per square inch. When the coupling is employed to couple hoses used for irrigation of large farms or similarly large land regions, difficulties arise because larger hose lengths are used, i.e., approximately 660 feet in length, and lower water pressures are used to charge the hoses, namely, approximately 50 lbs. per square inch. When pulling such large hoses, loaded with water under reduced pressures, one has to use a small gripping area between sleeve hose and coupling in order to achieve a high force per unit area of gripping. Such high force per unit area tends to tear into the hose portion being gripped so as to eventually render the hose incapable of being gripped because its body becomes damaged or shredded by such high forces per unit area. If one tries to enlarge the gripping area about the hose while under reduced water pressure so as to avoid such shredding of the hose, it is found that the lowered water pressure used for irrigating hoses is insufficient to affect gripping action so that there is leakage at the coupling, or the hose tends to slip out of its coupling.

I have discovered that by putting a taper, either single or double, either on the sleeve or on the wedge used in the coupler of U.S. Pat. No. 3,226,137, with the outside diameter of the mid-point of the taper being greater than the outside diameter of the ends of the taper, I increase the life of the hose in the following manner. The larger outside diameter of the sleeve serves as a ridge or line contact between sleeve and hose jacket, permitting the sleeve to be charged and sealed hydrostatically at the water pressure in the hose. When the hose is mechanically dragged across terrain, a very high pull of approximately 16,000 lbs. is developed. Such pull would normally cause this ridge of pressure to tear the hose at the region of gripping. But because of the taper in the sleeve or wedge, the sleeve area or contact area against the hose jacket increases, maintaining sufficient force per area between sleeve and hose jacket but not so much as to cause the sleeve to cut into the hose jacket.

In effect, the use of a tapered sleeve allows (a) a good gripping action between sleeve and hose jacket at low pressures if approximately 50 lbs. per square inch is provided over a narrow area of contact but (b) at greater water pressures or at very high end pulls of the hose, the gripping action is automatically distributed over a larger area so as to maintain proper gripping action. In effect, the change in geometry of the sleeve or wedge allows for the hose to accommodate pressure changes and increased end pull forces without jeopardizing the life of the hose.

Consequently, it is a principal object of this invention to be able to vary the end pulls on a long hose without damaging that portion of the hose being gripped in a coupling attached to such hose; this is accomplished by having the hose's pressure points with respect to a surrounding gripping sleeve in the coupling automatically change with changing end pulls and water pressures.

DESCRIPTION OF THE INVENTION

Figure 1:
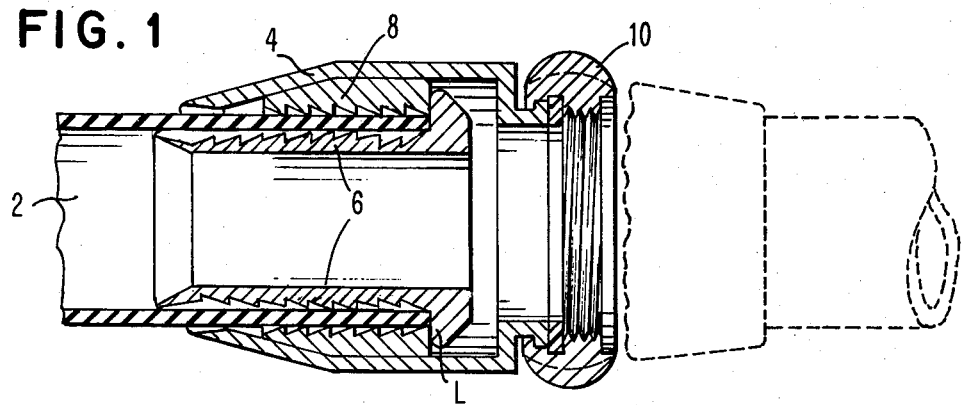
FIG. 1 is an embodiment of the invention showing the tapered sleeve in a hose coupler when the hose is gripped by the sleeve of the coupler in a relaxed state.

In FIG. 1 is shown a conventional hose coupler wherein a hose jacket 2 is insertable into outer tapered housing 4 of a coupler between a sleeve 6 and a wedge 8. Both the sleeve 6 and wedge 8 can be made of metal or of any material that will maintain its integrity under high water pressures or strong end pulls. The end of housing 4 is made free-fitting to a swivel nut 10, the latter being threaded to serve as a female member to accept the standard male end of a hose coupling. Whether the coupling is a male or female coupling is immaterial to the invention. In many coupling devices used in connecting hoses for irrigation purposes, neither threaded ends nor attached swivel units are used. Many other type locking mechanisms are employed. The basic feature is the role that the tapered sleeve 6 plays in increasing the life of a hose 2 that is gripped by it.

Figure 2:
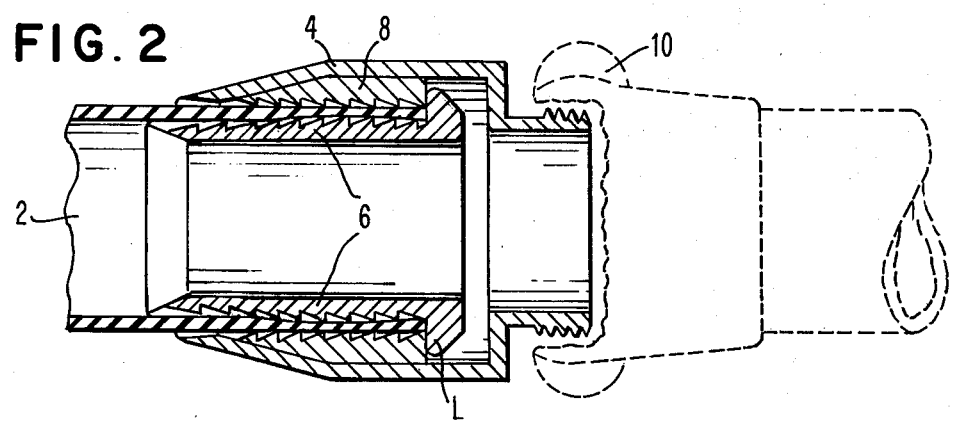
FIG. 2 is an embodiment of the invention showing the respective positions of the doubly tapered sleeve and hose when the hose is charged.

As seen in FIG. 2, when water pressure is increased, or end pulls are increased, the presence of lip L on sleeve 6 as well as the taper of housing 4 causes sleeve 6 and wedge 8 to be further moved to the left, causing the hose jacket 2 to be gripped over a larger region of contact between hose jacket 2 and wedge 8 and sleeve 6.

Figure 3:
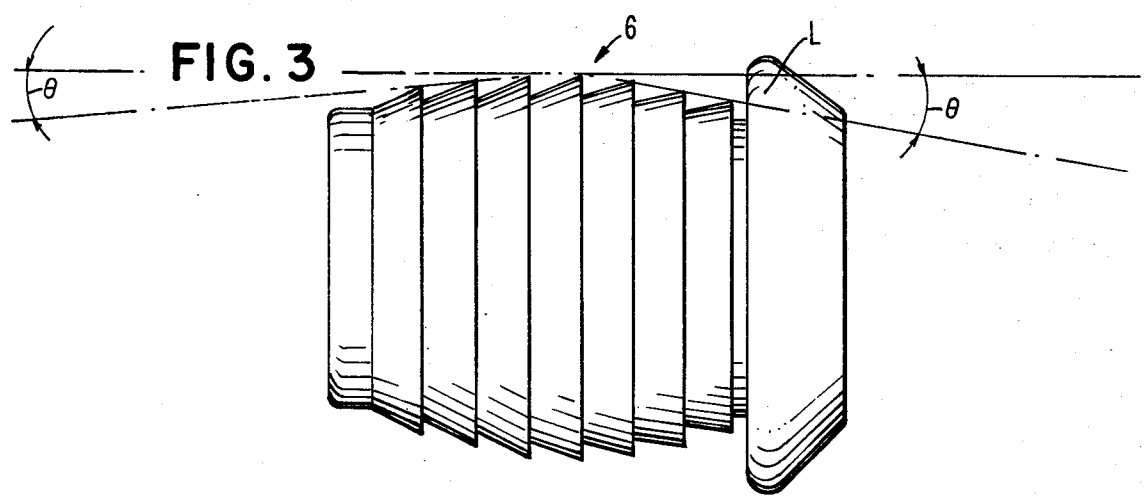
FIG. 3 is a showing of a double tapered sleeve used to attain an improved hose coupler.

As seen in FIG. 3, the sleeve 6 is serrated at its outer perimeter to enhance its gripping action of a hose 2 that encircles it, but it is also tapered so that its central diameter is larger than the two diameters at the ends of the sleeve 6. The central diameter can be considered the ridge or high point of the sleeve 6. The angle $\theta$ of the taper is approximately 1 to 4 degrees with 2 degrees being preferred. As seen in FIG. 1, when the hose 2 is gripped by the sleeve 6 by urging the wedge 8 and sleeve 6 toward the smaller diameter region of the housing 4, it is only the ridge portion of tapered sleeve 6 that serves to apply pressure to hose 2 under relaxed conditions, i.e., substantially no end pull forces on long hose 2 and low water pressures in the hose. However, when the hose 2 is charged with water under increased pressure and there is a high end pull on the hose 2, the latter is gripped over a larger region of the tapered sleeve because the mechanically dragging of a large hose section along the ground causes the sleeve area, i.e., the contact area, over the hose jacket 2 to increase. This increased gripping action over a larger area diminishes the cutting effect of the ridge of sleeve 6 on the hose jacket, thus preventing the shredding and tearing of the hose jacket. Moreover, since the gripping action on the hose jacket is greater at the center of the tapered sleeve 6 than at the reduced diameter of the sleeve 6, there is less chance of cutting through the sleeve jacket near the end of the coupling, where such cutting would cause leakage of water, if not tearing away of the hose 2 from its coupling.

Figure 4:
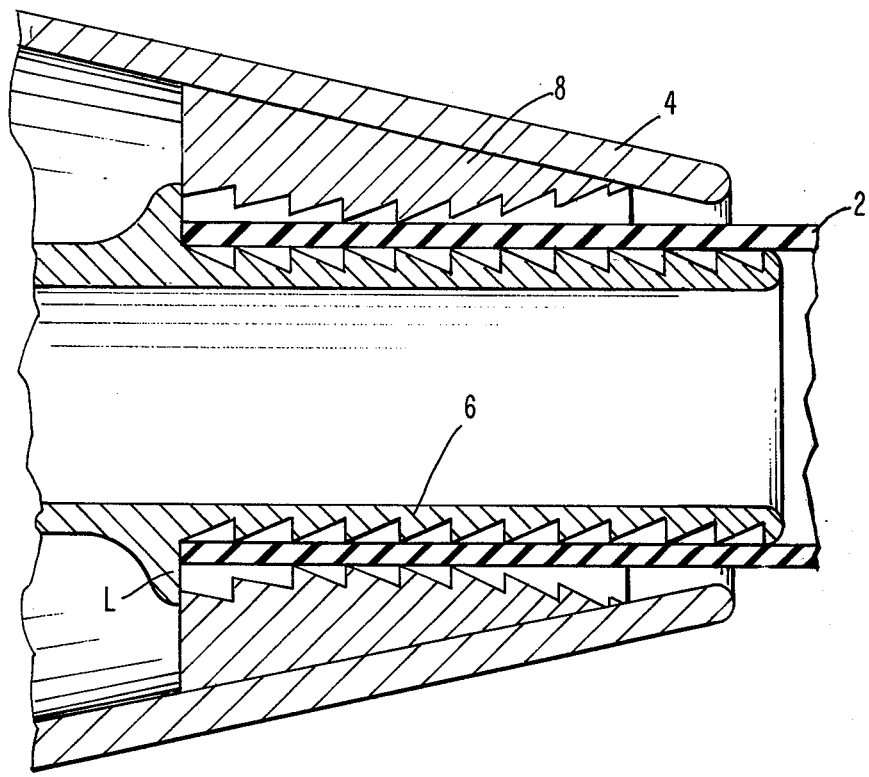
FIG. 4 is a variation of the invention where the doubly tapered member in the hose coupling is a wedge rather than the sleeve of the coupling.
Figure 5:
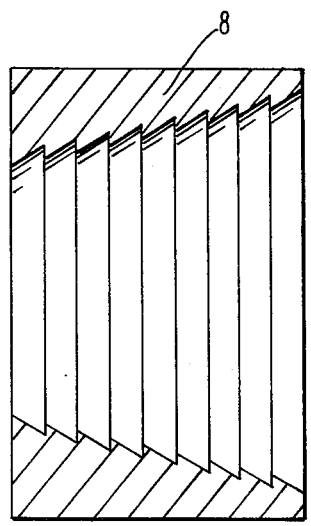
FIG. 5 is a showing of a single tapered wedge.
Figure 6:
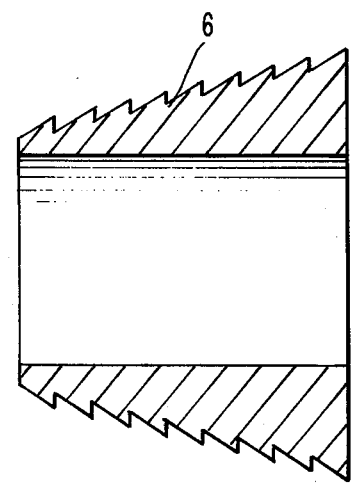
FIG. 6 is a showing of a single tapered sleeve that can also be used to carry out the present invention.

In FIG. 4, it is seen that the wedge 8 can be doubly tapered and the angle of taper can vary from approximately 1 to 4 degrees. Likewise, as seen in FIGS. 5 and 6, a single tapered sleeve 6 or a single tapered wedge 8 can be used wherein, at low water pressures and low end pulls, gripping action takes place at the ridge of the taper but is automatically distributed over a larger area at high water pressures and at high end pulls.

It has been found that the use of tapered gripping units preserves the lives of hose jackets many more times than the untapered gripping units, particularly when heavy, long hoses, charged with water, are dragged along rough terrain.

What is claimed is:

1. A coupler for extremely long flexible hoses that are subjected to very high end pulls comprising
    a hollow main body section, the interior wall of which tapers from a maximum diameter at one end to a minimum diameter at its other end,
    a tubular hose-entering chamber at the minimum diameter end of said body section,
    said chamber including a sleeve member and a concentrically disposed wedge member, each member being movable axially within said tapered hollow main body section and adapted to embrace a hose jacket that enters said chamber, and is gripped between said members one of said members being doubly tapered with the apex edge of said double taper being in direct contact with said hose jacket when said jacket is gripped by said members, both the angles of said double taper being no greater than approximately 4 degrees, said wedge member having a tapered external surface adapted to engage the tapered interior wall of the main body section,
    a larger gripping area of said tapered member being in contact with said hose jacket when said members are moved axially within the tapered hollow main body section, whereby the gripping action takes place at the ridge of the taper at low water pressures and low end pulls but is automatically distributed over a larger area at high water pressures and at high end pulls.

2. The coupler of claim 1 wherein there are serrations on said sleeve member in contact with said hose jacket.

3. The coupler of claim 1 wherein there are serrations on said wedge member in contact with said hose jacket.

* * * * *